(12) United States Patent
Oda et al.

(10) Patent No.: US 6,445,582 B1
(45) Date of Patent: Sep. 3, 2002

(54) POWER SUPPLY APPARATUS

(75) Inventors: Takashi Oda, Kato-gun; Tatsuhito Horiuchi, Kakogawa, both of (JP)

(73) Assignee: Sanyo Electric Co., Ltd., Moriguchi (JP)

(*) Notice: Subject to any disclaimer, the term of this patent is extended or adjusted under 35 U.S.C. 154(b) by 0 days.

(21) Appl. No.: 09/918,571

(22) Filed: Aug. 1, 2001

(30) Foreign Application Priority Data

Aug. 3, 2000 (JP) ........................................ 2000-235526

(51) Int. Cl.[7] ................................................ H05K 7/20
(52) U.S. Cl. .................... 361/695; 165/43; 361/716; 429/27; 429/120
(58) Field of Search ............................ 429/22, 27, 62, 429/99, 120; 320/107, 312; 363/141; 454/184; 165/80.3, 43, 121–126; 123/41.01; 136/259; 180/65.1, 68.2, 68.5; 361/690, 692, 694, 695, 709–712, 715, 716, 830, 831, 328

(56) References Cited

U.S. PATENT DOCUMENTS 4,913,983 A * 4/1990 Cheiky ........................ 429/13
5,879,833 A * 3/1999 Yoshii et al. .................. 429/62
6,211,646 B1 * 4/2001 Kouzu et al. ................ 320/107
6,326,761 B1 * 12/2001 Tareilus ...................... 318/722

FOREIGN PATENT DOCUMENTS

| JP | 10-270095 | 10/1998 |
|---|---|---|
| JP | 11-329518 | 11/1999 |

* cited by examiner

*Primary Examiner*—Gerald Tolin
(74) *Attorney, Agent, or Firm*—Wenderoth, Lind & Ponack, L.L.P.

(57) ABSTRACT

The power supply apparatus has a plurality of power modules, a holder-case housing a parallel arrangement of power modules in a plurality of rows and columns, and a fan. The interior of the holder-case is divided into a plurality of partitions by walls. Wall surfaces follow the contours of power module surfaces to establish cooling ducts of uniform width. The holder-case has flow inlets opened through the first surface plate and exhaust outlets opened through the second surface plate. The power supply apparatus uses the fan to divide and induce air flow through flow inlets into a plurality of partitions, and expels air which has passed through cooling ducts out the exhaust outlets thereby cooling power modules disposed inside the partitions.

23 Claims, 7 Drawing Sheets

POWER SUPPLY APPARATUS

This application is based on application No. 235526 filed in Japan on Aug. 3, 2000, the content of which incorporated hereinto by reference.

BACKGROUND OF THE INVENTION

This invention relates to a high current power supply apparatus primarily used to power a motor to drive a vehicle such as a hybrid or electric car.

A high current, high output power supply apparatus used as a power source for a motor to drive an automobile contains power modules. Power modules are a plurality of series connected batteries, and they are in turn connected in series to raise the output voltage of the power supply apparatus. The purpose of this is to increase the output of the driving motor. Extremely high currents flow in a power supply apparatus used for this type of application. For example, in a vehicle such as a hybrid car, when starting to move or accelerating, battery output must accelerate the car, and extremely high currents over 100A can flow. High currents also flow during short period, rapid charging.

In a high current power supply apparatus, forced cooling is required when battery temperature rises. In particular, in a power supply apparatus with many power modules inserted in vertical and horizontal columns and rows in a holder-case, it is important to uniformly cool each power module. This is because performance degradation will result for a battery which rises in temperature when battery cooling is non-uniform.

Systems which house a plurality of power modules in a holder-case and cool each power module more uniformly are cited, for example, in Japanese Patent Applications HEI 10-270095 (1998) and HEI 11-329518 (1999). As shown in the cross-section view of FIG. 1, the power supply apparatus of the former application cools internally housed power modules 121 by forcing air to flow from air intakes 123 which form the base of the holder-case 122 to exhaust outlets 124 which form the top of the holder-case 122. Cooling adjustment fins 125 are disposed inside the holder-case 122 to adjust the speed of air flowing over the surfaces of power modules 121.

Figure 1:
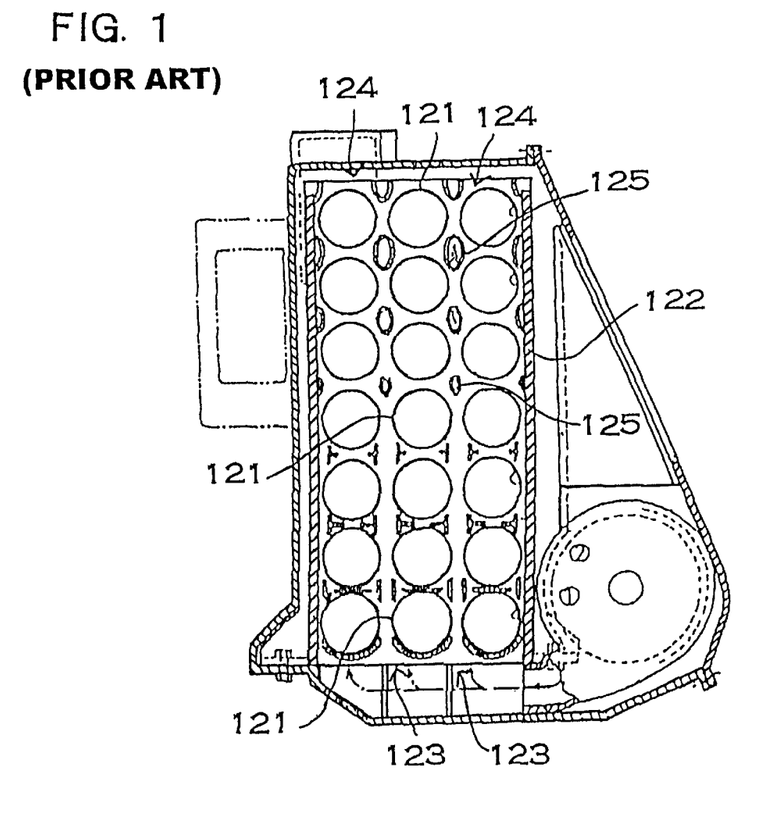
FIG. 1 is a cross-section view of a prior art power supply apparatus.

In a holder-case 122 of this configuration, air flows more rapidly over the surfaces of power modules 121 disposed near the top than those near the bottom. The purpose of this is to avoid a temperature differential between power modules 121 at the top and bottom. If the flow rate of air passing over the surfaces of power modules 121 at the top and bottom is made the same, power modules 121 at the bottom will be cooled more efficiently than those at the top because air flowing over the surfaces of power modules 121 at the bottom has a lower temperature.

To make the flow rate of air over power modules 121 at the top faster than the flow rate over those at the bottom, the gap for air flow between the cooling adjustment fins 125 and the power modules 121 is gradually made narrower towards the top of the holder-case 122. This is because air flow becomes faster as the gap for air flow becomes narrower.

This type of power supply apparatus cools power modules near the bottom with cool air and power modules near the top with high flow rate air to establish a more uniformly cooled environment for power modules at both the top and bottom. However, it is extremely difficult to cool upper and lower power modules under very uniform conditions in this type of system. This is because the temperature of cooling air for power modules at the bottom is low, and the temperature of cooling air for power modules at the top becomes high. It is difficult to cool upper power modules with the same efficiency as lower power modules even by increasing the flow rate over power module surfaces when upper power module cooling air temperature has become high. For this reason power modules near the air intakes can be cooled efficiently, but power modules near the exhaust outlets are difficult to cool efficiently and this system has the drawback that temperature differential develops over power modules housed in the holder-case. This has the deleterious effect that power modules, which are near exhaust outlets and very difficult to efficiently cool, become hot and easily degraded.

Figure 2:
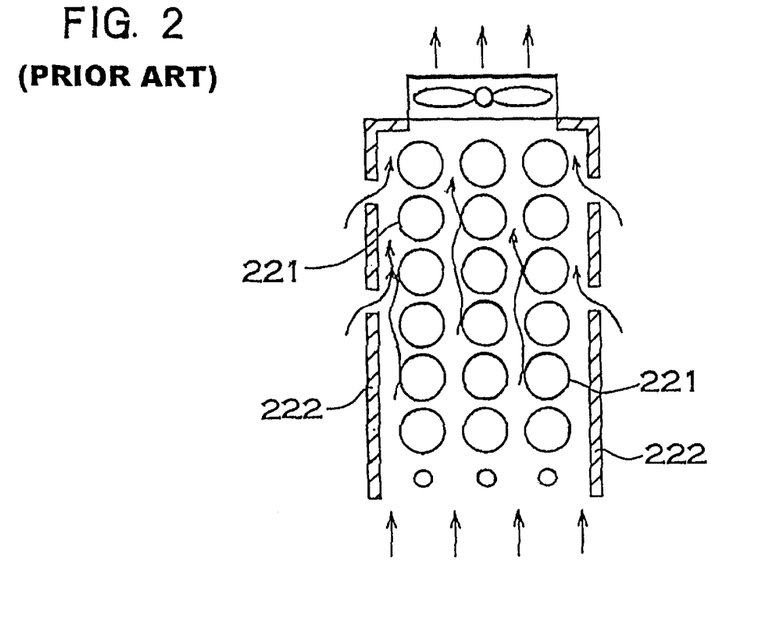
FIG. 2 is a cross-section view of another prior art power supply apparatus.

As shown in the cross-section view of FIG. 2, the power supply apparatus cited in the later patent application directs cooling air into the holder-case 222 from intermediate positions along the holder-case 222. Air directed into the holder-case 222 from intermediate positions supplies cool air to regions near the outlet and makes the inside temperature of the holder-case 222 uniform. This system can reduce the temperature differential across the holder-case 222, but the flow rate of air inside drops due to air entering from intermediate positions along the holder-case 222. To efficiently cool power modules 221, it is important to lower the temperature of the cooling air, but it is also important to increase the flow rate of air over the surfaces of the power modules 221. Even if cooling air temperature is lowered, the region of air immediately in contact with the surface of a power module will rise in temperature if flow rate slows. Since a power module 221 is cooled by the air in immediate contact with its surface, it cannot be efficiently cooled if the temperature of this region of air becomes high.

The present invention was developed to correct these types of drawbacks seen in prior art power supply apparatus. Thus it is a primary object of the present invention to provide a power supply apparatus which can cool all of the plurality of power modules housed in a holder-case more uniformly and effectively prevent battery performance degradation caused by temperature differentials.

The above and further objects and features of the invention will more fully be apparent from the following detailed description with accompanying drawings.

SUMMARY OF THE INVENTION

The power supply apparatus of the present invention is provided with a plurality of power modules, a holder-case which houses the power modules arranged in rows in a parallel fashion and which cools the power modules by passing air through the inside of the case, and a fan which forcibly supplies air to the holder-case or intakes air through the holder-case. The holder-case is box-shaped and has a first surface plate and a second surface plate disposed on opposite sides. A plurality of power modules are arranged side-by-side in line with the plane of the first and second surface plates in a plurality of columns. Further, walls are established between the plurality of power modules laterally arrayed in the holder-case. The walls are located between the first surface plate and the second surface plate. The interior of the holder-case is divided into a plurality of columns of partitions by the walls, and power modules are disposed in each partition column. The surfaces of partition walls facing power modules follow the contour of the surfaces of the power modules, and cooling ducts of uniform width are established between power module surfaces and partition walls facing the power modules. Air forced into the partitions has its flow directed along power module surfaces by the cooling ducts. In addition, the holder-case has flow inlets opened through the first surface plate to divide air flow and direct it into the cooling ducts of the plurality of partition columns. Exhaust outlets are also opened through the second surface plate to expel air which has passed through the plurality of cooling ducts. The power supply apparatus uses the fan to divide and divert air flow through the first surface plate flow inlets into the plurality of partitions, passes air through the cooling ducts to cool the power modules, expels air which has performed its cooling function through second surface plate exhaust outlets, and thereby cools the power modules disposed inside the plurality of partition columns.

This configuration of power supply apparatus has the characteristic that all of the plurality of power modules housed in the holder-case can be more uniformly cooled, and battery performance degradation caused by temperature differentials can be effectively prevented. This is because the power supply apparatus of the present invention divides the interior of the holder-case with walls into a plurality of columns of partitions, disposes power modules in each partition column, establishes cooling ducts of uniform width via partition walls which follow power module contours, and causes air forced into the partitions to flow along power module surfaces via the cooling ducts. Since the cooling ducts in this configuration of power supply apparatus are uniform in width, the flow rate of air in the holder-case does not decrease and power modules can be efficiently cooled. Further, since the cooling ducts of this power supply apparatus are made to follow the surfaces of the power modules, air flowing through the cooling ducts has to make direct contact with all regions of the surfaces of the power modules, and cooling can be extremely efficient and uniform.

In a power supply apparatus of the present invention, cooling ducts can be made uniform in width around the entire perimeter of each power module. Further, it is preferable to arrange the plurality of power modules in a parallel fashion and in an array with a plurality of rows and a plurality of columns inside the holder-case of a power supply apparatus of the present invention.

The plurality of power modules of a power supply apparatus of the present invention may be housed in the holder-case in a two row array. In that case, at least one dead air space can be established in the upstream partition of the first row disposed on the side of the first surface plate. In this power supply apparatus, the downstream partition cooling ducts can be made nearly constant in width over approximately the entire power module circumference, and the width of the upstream partition cooling ducts can be made wider than the width of the downstream partition cooling ducts to establish at least one dead air space. The upstream partition cooling ducts can be made nearly constant in width over approximately half the power module circumference, in the remaining half they can be made wider to establish dead air spaces. The dead air spaces can be established on the downstream side of the upstream partition. Further, a plurality of dead air spaces can be established around approximately the entire power module circumference in the upstream partition. The upstream partition can be square-shaped in a cross-section view to establish a dead air space at each part of its four corners. Furthermore, the width of cooling ducts between the upstream and downstream sides in the upstream partition can be equal to the width of cooling ducts of the downstream partition.

Further, in a power supply apparatus of the present invention with a plurality of power modules housed in the holder-case in a two row array, a bypass may also be established to direct air flow from the upstream partition of the first row adjacent to the first surface plate to the downstream partition of the second row adjacent to the second surface plate.

Still further, in a power supply apparatus of the present invention with a plurality of power modules housed in a plurality of rows in the holder-case, the plurality of power modules in adjacent rows may also be offset.

It is preferable to provide retaining projections extending from partition walls facing power modules. The ends of these retaining projections contact the surface of a power module and hold that power module in place inside the partition.

Finally, it is preferable for the power modules and partitions to be shaped as circular columns, and disposition of power modules at partition centers can establish cooling ducts of uniform width.

DETAILED DESCRIPTION OF THE INVENTION

Figure 3:
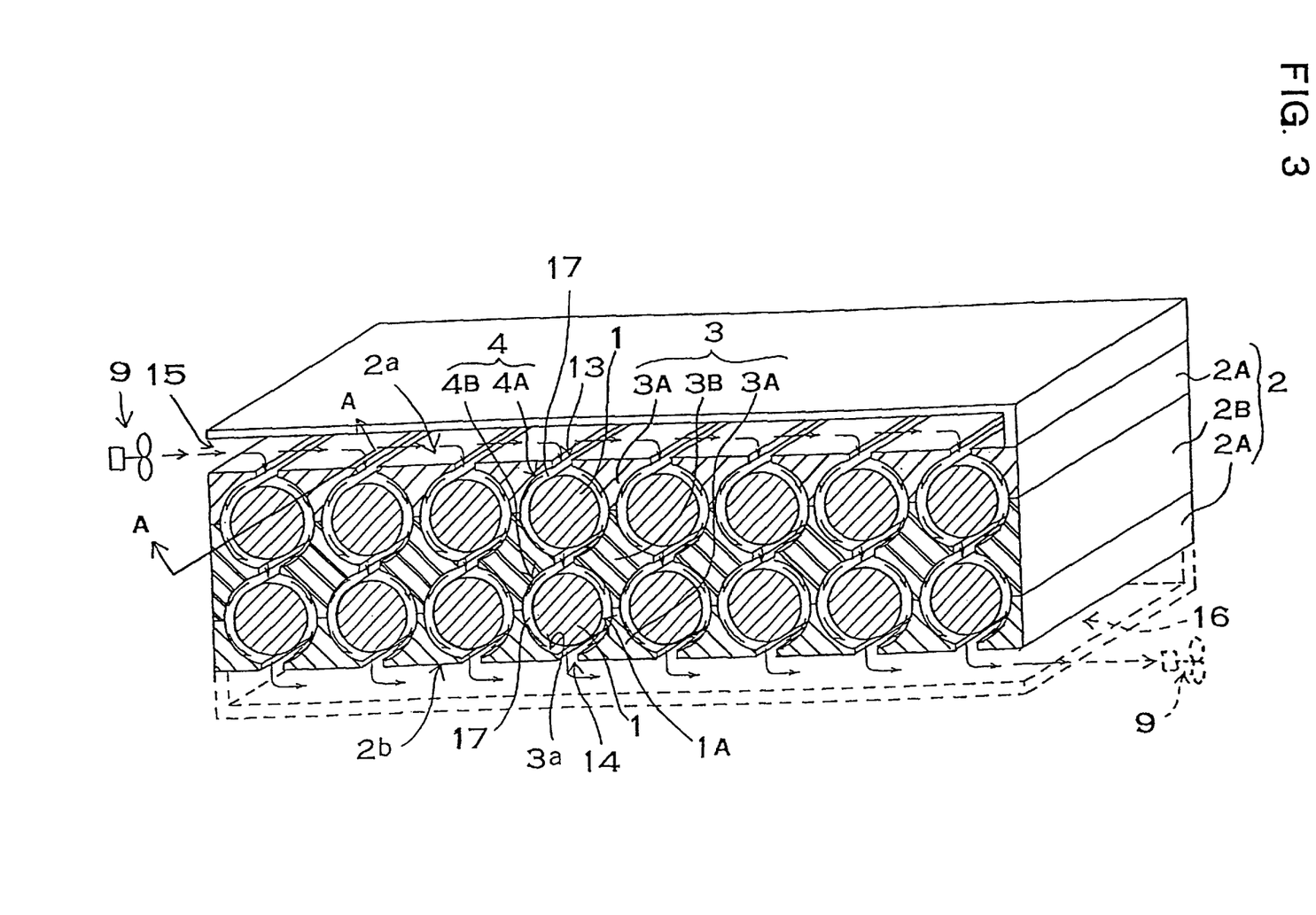
FIG. 3 is an oblique cross-section view of an embodiment of the power supply apparatus of the present invention.

The power supply apparatus shown in FIG. 3 is provided with a plurality of power modules 1, a holder-case 2 which houses these power modules 1, and a fan 9 to cool power modules 1 in the holder-case 2. The holder-case 2 holds the power modules 1 arranged in a parallel fashion of a plurality of rows and columns, and cools the power modules 1 with air which passes through the case.

A power module 1 is a plurality of rechargeable batteries or high capacitance super-capacitors joined in a linear fashion. For example, power modules 1 may have six series connected rechargeable batteries 6 joined in a straight line. A power module using super-capacitors has a plurality of super-capacitors connected in parallel or series. However, a power module 1 may also be made up of a single rechargeable battery or super-capacitor. The power module 1 shown in FIG. 4 has circular cylindrical rechargeable batteries 6 joined in a straight line by dish-shaped connectors 7. Electrode terminals 5 comprising a positive electrode terminal 5A and a negative electrode terminal 5B are connected at the ends of a power module 1.

Figure 4:
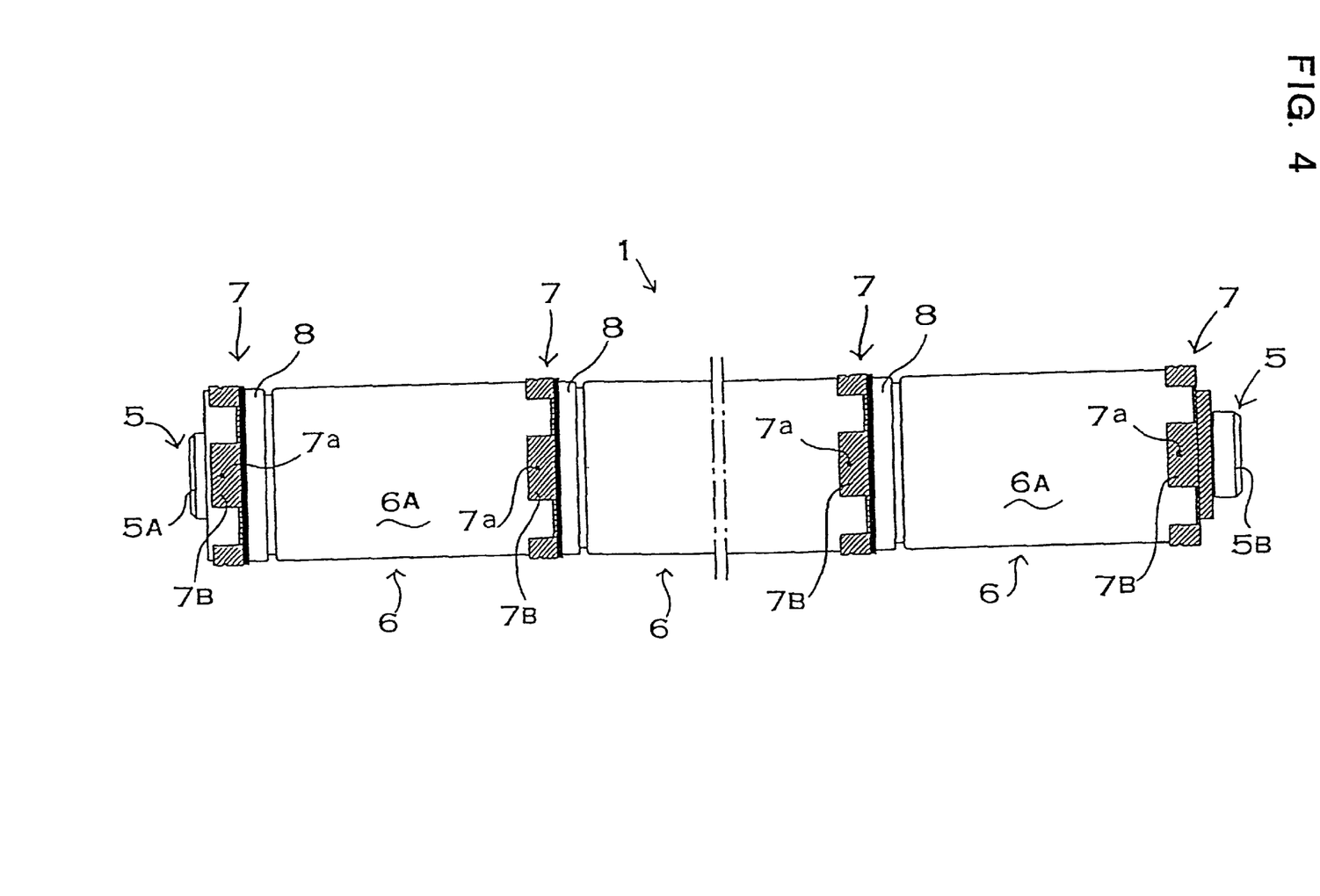
FIG. 4 is a side view of a power module housed in the power supply apparatus shown in FIG. 3.
Figure 5:
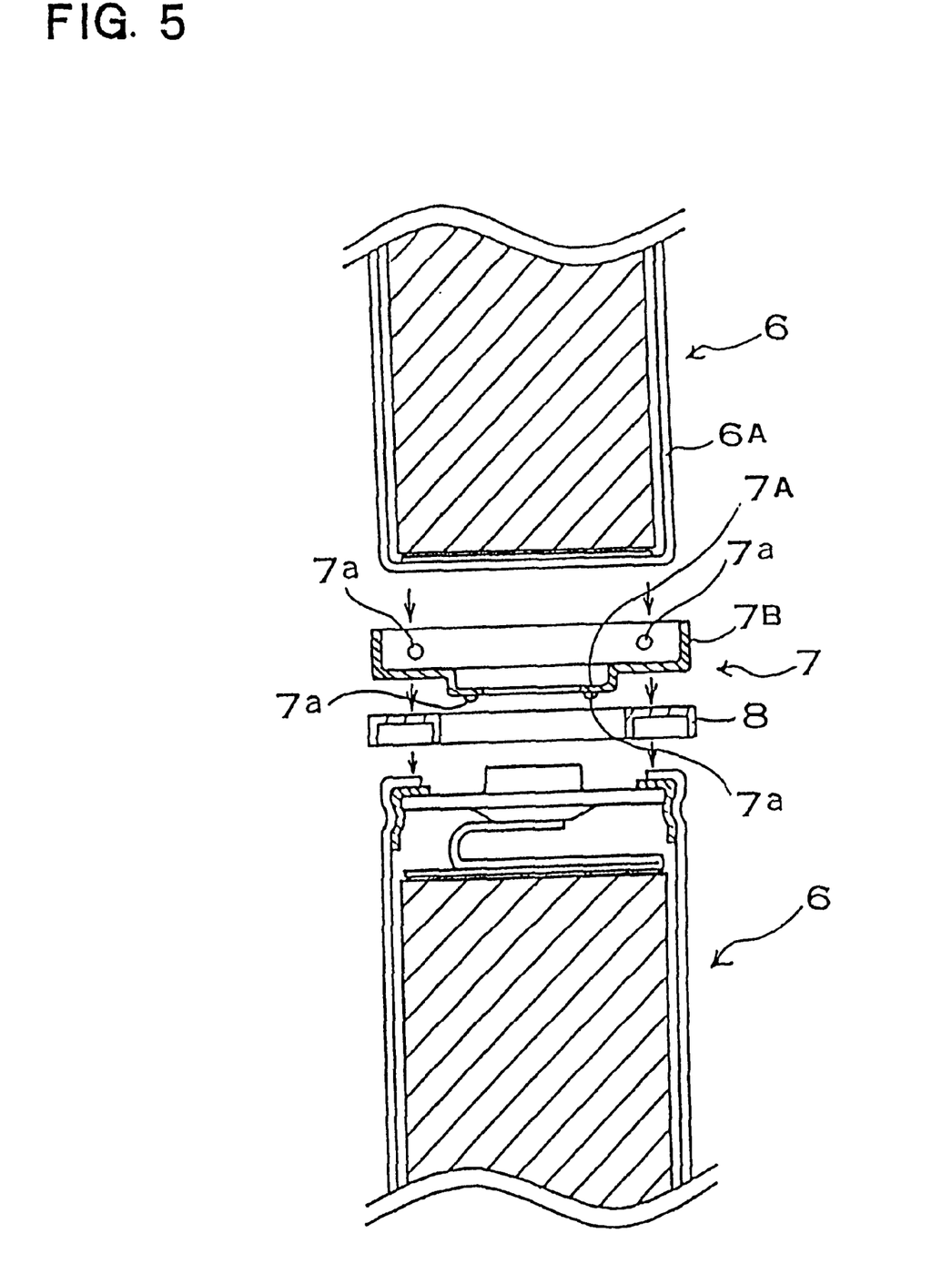
FIG. 5 is an exploded cross-section view of the power module shown in FIG. 4.

The structure for connecting rechargeable batteries 6 in a straight line with dish-shaped connectors 7 is shown FIGS. 4 and 5. In a power module 1 of this structure, a disk region 7A of a dish-shaped connector 7 is weld-connected to the positive terminal of a circular cylindrical battery 6. The disk region 7A of the dish-shaped connector 7 is provided with projections 7a for welding to the positive terminal of the circular cylindrical battery 6. When the projections 7a of the dish-shaped connector 7 are welded to the positive terminal, welding electrode rods push on the top surfaces of the projections 7a. To prevent short circuits between the dish-shaped connector 7 and the circular cylindrical battery 6, a ring-shaped insulator 8 is sandwiched between the dish-shaped connector 7 and the circular cylindrical battery 6.

In addition, a circular cylindrical battery 6 is inserted into the dish-shaped connector 7 flange region 7B to connect the negative terminal of the circular cylindrical battery 6, which is its outer case 6A, with the flange region 7B. Similar to the disk region 7A, the flange region 7B also has projections 7a provided on its inner surface for welding to the battery outer case 6A. During welding, welding electrode rods push on the outsides of the flange region 7B projections 7a.

Although not illustrated, series connected batteries can be joined without using dish-shaped connectors by weld-connection to the facing sides of lead-plates bent in U-shapes. In this power module, battery terminals are welded to facing sides of U-shaped lead-plates by passing a high current pulse through the batteries in the direction of battery discharge. Further, metal plates can also be sandwiched between positive and negative battery terminals, and a high current pulse can be passed through the batteries in their direction of discharge to weld the metal plates to the battery terminals.

Still further, positive and negative battery terminals of a power module can also be directly welded together with no intervening metal plate between batteries. Here, conical projections are provided on the upper surface of a battery sealing plate, which is the positive electrode terminal, and these projections are welded to the negative electrode terminal of an adjacent battery by passing of a high current pulse.

Power modules, which have a plurality of rechargeable batteries 6 connected in series, have the positive side of the batteries 6 connected to a positive terminal 5A and the negative side connected to a negative terminal 5B.

Rechargeable batteries 6 of the power modules 1 are nickel-hydrogen batteries. However, batteries such as nickel-cadmium batteries or lithium-ion batteries may also be used as the rechargeable batteries 6 of the power modules 1.

Although not illustrated, temperature sensors are fixed to the surface of each rechargeable battery of the power modules. Temperature sensors are devices which can measure battery temperature. Preferably, PTC devices which change electrical resistance with battery temperature are used as temperature sensors. Temperature sensors fixed to the surface of each battery 6 are connected linearly and in series via sensor leads, which extend along, and are fixed lengthwise to the surface of the power modules. Temperature sensors and sensor leads are attached to battery surfaces by material such as heat-shrink tubing which covers the surfaces.

As shown in FIG. 3, the holder-case 2 is box-shaped having a first surface plate 2a and a second surface plate 2b as opposing surfaces. A plurality of rows and columns of power modules 1 are arranged in planes parallel to the first surface plate 2a and second surface plate 2b. The holder-case 2 of FIG. 3 houses two rows and eight columns of power modules 1 in its interior. However, although it is not illustrated, the plurality of power modules housed in the holder-case of the power supply apparatus of the present invention may also be arranged in one row, or in three or more rows. A power supply apparatus with a plurality of power modules arranged in one row has the characteristic that each power module column can be efficiently cooled. A power supply apparatus with a plurality of power modules arranged in three or more rows has the characteristic that many power modules can be housed in a compact fashion.

The holder-case 2 is provided with upper and lower cover-casings 2A and an intermediate-casing 2B disposed between the cover-casings 2A. The cover-casings 2A are made up of a first cover-casing formed as a single unit with the first surface plate 2a, and a second cover-casing formed as a single unit with the second surface plate 2b. The cover-casings 2A and the intermediate-casing 2B overall are formed from plastic, and assembly primarily of these casings results in the holder-case 2.

In addition, the holder-case 2 is provided with walls 3 between the eight columns of power modules 1. The walls 3 extend from the first surface plate 2a to the second surface plate 2b and divide the interior into a plurality of partitions 4. The walls 3 of holder-case 2 shown in FIG. 3 have two end regions 3A formed as single units with the upper and lower cover-casings 2A and a center region 3B formed as a single unit with the intermediate-casing 2B. These regions are joined without gaps at the interfaces. In this wall 3 structure, both end regions 3A mate with the first surface plate 2a and the second surface plate 2b. However, although it is not illustrated, the walls may also be formed in entirety as single units with the cover-casings, or as a single unit with the intermediate-casing. In the case where walls are formed in entirety as a single unit with the intermediate-casing, both ends of the walls extend to the first and second surface plates and contact their inside surfaces. The first and second surface plates are tightly joined to the walls in a manner which avoids air leaks.

Figure 6:
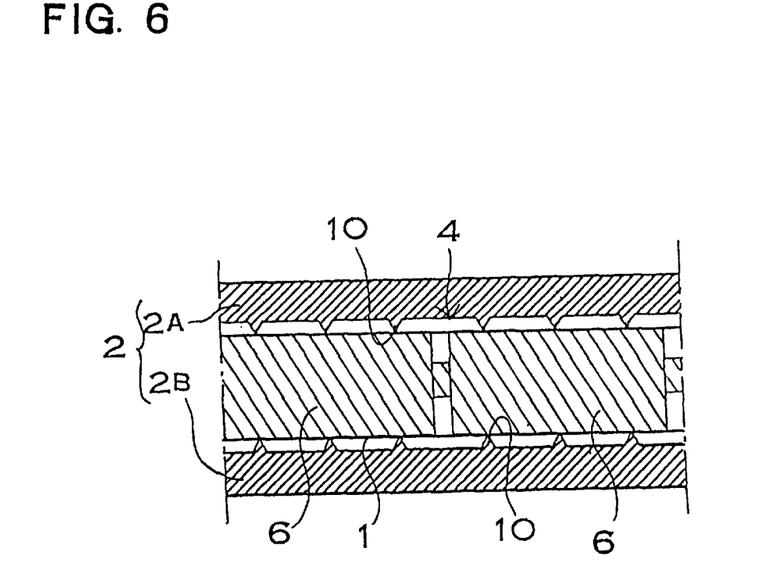
FIG. 6 is a cross-section view at the line A—A of the power supply apparatus shown in FIG. 3.

Power modules 1 are disposed in each partition 4. In the holder-case 2 of the figures, two rows of power modules 1 are disposed in each partition 4. As shown in FIG. 6, retaining projections 10 are formed by single piece construction protruding from partition 4 walls to hold power modules 1 in fixed positions within the partitions 4. Retaining projections 10 are formed as single pieces with the cover-casings 2A and the intermediate-casing 2B, and power modules 1 are retained in fixed positions by sandwiching them between the retaining projections 10 of the cover-casings 2A and intermediate-casing 2B. Power modules 1 are held by the retaining projections 10 in a manner that creates gaps through which air can flow between the power modules 1 and the inside surfaces of the partitions 4. Retaining projections 10 extend laterally with respect to the power modules 1.

The walls 3 are formed with surfaces 3a, which face power modules 1, made to follow power module surface contours. Cooling ducts 17 of uniform width are thereby established between power module surfaces 1A and wall surfaces 3a to uniformly cool the power modules 1 disposed in each partition 4. The cooling ducts 17 of the partitions 4 shown in FIG. 3 have approximately uniform width over the entire perimeter of the power modules 1. In the power supply apparatus of FIG. 3, the power modules 1 and the partitions 4 are shaped as circular columns, and cooling ducts 17 of constant width are established by centering power modules 1 within the partitions 4. Although it is not illustrated, power modules may also be shaped as square columns. In a power supply apparatus housing power modules of this shape, both the power modules and the partitions are shaped as square columns, and again cooling ducts of constant width can be established around power module perimeters by centering the power modules within the partitions.

Figure 7:
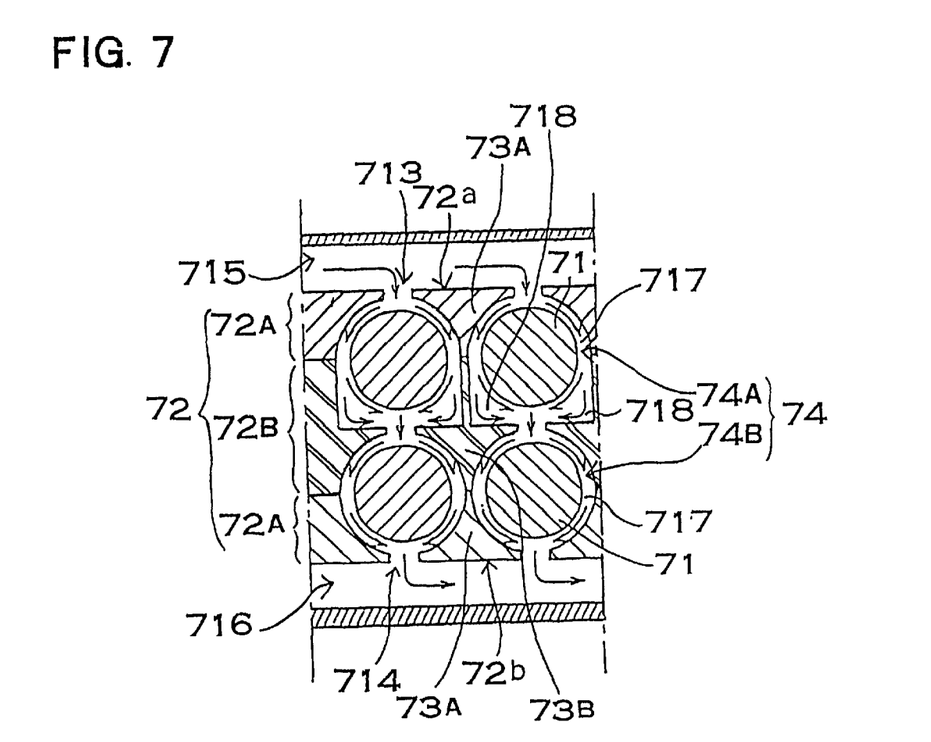
FIG. 7 is a cross-section view of another embodiment of the power supply apparatus of the present invention.
Figure 8:
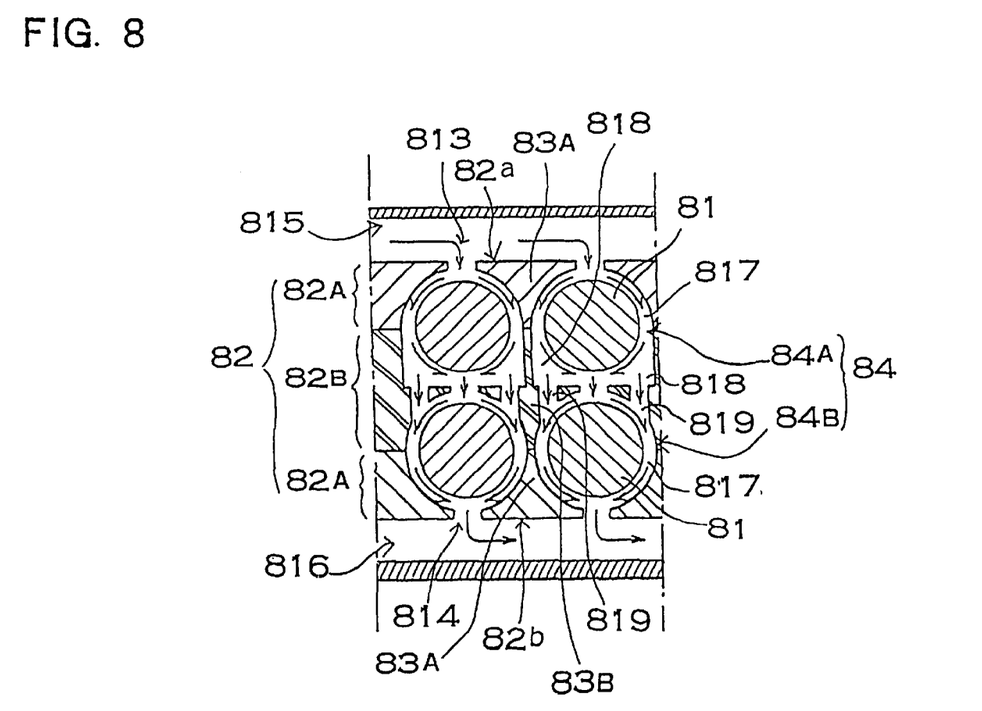
FIG. 8 is a cross-section view of another embodiment of the power supply apparatus of the present invention.

This configuration of power supply apparatus has the characteristic that power modules 1 can be cooled by air, which is directed into a partition 4, and that air is made to flow at high flow rates over the entire perimeters of the power modules 1. However, the power supply apparatus of the present invention may also have partitions shaped as shown in FIGS. 7 and 8. The holder-case 72 of the power supply apparatus shown in FIG. 7 houses power modules 71 arranged in two rows. The cooling ducts 717 of the upstream partitions 74A in the first row disposed on the side of the first surface plate 72a are made nearly constant in width over approximately half the power module 71 circumference, arid are made wider over the remaining half to establish dead air spaces 718. The cooling ducts 717 of the downstream partitions 74B are made nearly constant in width over approximately the entire power module 71 circumference. The dead air spaces 718 have large volume compared with the cooling ducts 717, and air passing through these dead air spaces 718 decreases in flow rate to adjust power module 71 cooling effectiveness to a lower level.

In the power supply apparatus of FIG. 8, bypasses 819 are established to direct air flow from upstream partition 84A dead air spaces 818 to downstream partitions 84B. The upstream partitions 84A and the downstream partitions 84B of the holder-case 82 of FIG. 8 are connected both at the center and through the bypasses 819. Bypasses 819 extend in a tangential direction from both sides of a dead air space 818 to connect with a downstream partition 84B.

While avoiding over-cooling of power modules 71, 81 in the upstream partitions 74A, 84A of holder-cases 72, 82 shaped as shown in FIGS. 7 and 8, power modules 71, 81 in downstream partitions 74B, 84B are more efficiently cooled. These holder-cases 72, 82 thereby have the characteristic that power modules 71, 81 disposed in upstream partitions 74A, 84A and in downstream partitions 74B, 84B can be cooled more uniformly. This is because high flow rate air is not made to flow around the entire circumference of power modules 71, 81 disposed in upstream partitions 74A, 84A, but high flow rate air is made to flow around the entire circumference of power modules 71, 81 disposed in downstream partitions 74B, 84B. Since air which divides and flows into each partition 74, 84 flows from the upstream partition 74A, 84A to the downstream partition 74B, 84B, the temperature of the air becomes higher when it passes through the downstream partition 74B, 84B than when it passes through the upstream partition 74A, 84A. This is because the air absorbs thermal energy when it passes through the upstream partition 74A, 84A cooling a power module 71, 81. If a power supply apparatus is designed to pass air through both the upstream partition and the downstream partition at the same flow rate and that flow rate is set to cool a power module in the downstream partition to a preferred temperature, the upstream partition can be overcooled. As shown in FIGS. 7 and 8, if a dead air space 718, 818 is established in part of the upstream partition 74A, 84A to reduce the flow rate of air flowing over the power module 71, 81 surface, the cooling efficiency for the power module 71, 81 in the upstream partition 74A, 84A can be adjusted to an optimal value. Consequently, power modules 71, 81 disposed in the upstream partition 74A, 84A and in the downstream partition 74B, 84B can be cooled uniformly. In FIGS. 7 and 8, 72A, 82A are cover-casings, 72B, 82B are intermediate-casings, 73A, 83A are end regions, and 73B, 83B are center regions of the holder-case 72, 82 walls. In FIG. 8, 817 designates cooling ducts.

Figure 9:
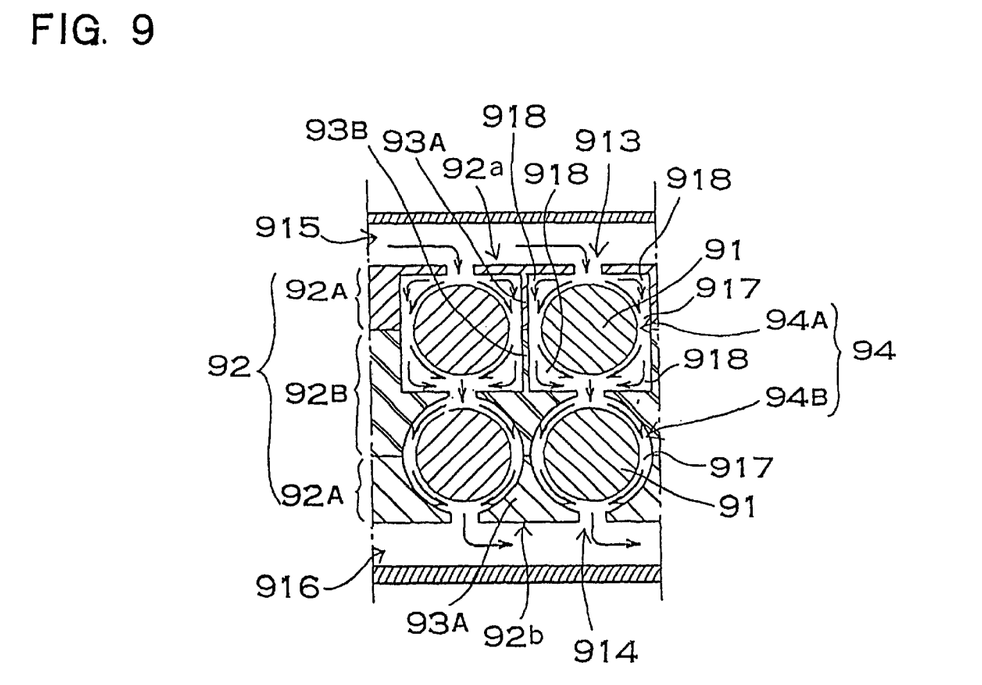
FIG. 9 is a cross-section view of another embodiment of the power supply apparatus of the present invention.

Further, a power supply apparatus can also have such a structure as shown in FIG. 9. In the power supply apparatus, power modules 91 are housed in the holder-case 92 in a two row array and a plurality of dead air spaces 918 are established in the upstream partition 94A of the first row disposed on the side of the first surface plate 92a. The width of cooling ducts 917 of the upstream partition 94A is made wider than the width of cooling ducts 917 of the downstream partition 94B of the second row disposed on the side of the second surface plate 92b to establish dead air spaces 918. The cooling ducts 917 of the downstream partition 94B are made nearly constant in width over approximately the entire power module 91 circumference. The width of cooling ducts 917 of the upstream partition 94A can be made wider over approximately the entire power module 91 circumference to establish dead air spaces 918.

The upstream partition 94A shown in FIG. 9 is square-shaped in a cross-section view and a power module 91 is centered within the upstream partition 94A. In the square-shaped upstream partition 94A, each part of its four corners is made wide to establish a dead air space 918. However, the upstream partition 94A can be also square-shaped with each part of the four corners curved. Further, the cooling ducts 917 between the upstream and downstream sides in the upstream partition 94A are made narrow in width to be equal to the width of cooling ducts 917 of the downstream partition 94B. The power supply apparatus of this type has a characteristic that a plurality of power modules 91 can be uniformly arranged in two rows. In a power supply apparatus with the above-mentioned configuration, the flow rate of air passing through each partition 94 can be adjusted most suitably by formation of vertical and bilateral pairs of dead air spaces established in the upstream partition and large capacity. In FIG. 9, 92A are cover-casings, 92B is the intermediate-casing, 93A are the end regions, and 93B is the center region.

The holder-case 2 divides the flow of cooling air and passes it through each partition 4. To realize this, flow inlets 13 are opened through the first surface plate 2a to divide the air flow and direct it into each partition 4, and exhaust outlets 14 are opened through the second surface plate 2b to expel air from each partition 4 to the outside.

In the holder-case 2, 72, 82,92 of FIGS. 3, 7 to 9, slit shaped flow inlets 13, 713, 813,913 are opened through the first surface plate 2a, 72a, 82a, 92a positioned at the center region of the partitions 4, 74, 84, 94 and slit shaped exhaust outlets 14, 714, 814, 914 are opened through the second surface plate 2b, 72b, 82b, 92b. The slit shaped flow inlets 13, 713, 813, 913 and exhaust outlets 14, 714, 814, 914 extend along the lengthwise direction of the power modules 1, 71, 81, 91. This configuration of holder-case 2, 72, 82, 92 has the characteristic that cooling air can be made to flow rapidly over power module 1, 71, 81, 91 surfaces for efficient cooling.

The power supply apparatus of FIG. 3 is provided with an air inlet duct 15 at the surface of the first surface plate 2a. The air inlet duct 15 connects with a fan 9, and the fan 9 forcibly supplies cooling air into the inlet duct 15. Inlet duct 15 cooling air flow is divided among each flow inlet 13 and introduced into each partition 4. In the power supply apparatus shown in FIG. 3, the plurality of flow inlets 13 opened through the first surface plate 2a all have equal area. However, although it is not illustrated, the power supply apparatus may also have smaller flow inlets at the upstream end of the air inlet duct than at the downstream end of the air inlet duct. This is for the purpose of passing cooling air uniformly through all partitions. Since cooling air supplied by the fan has higher pressure at the upstream end of the air inlet duct, large quantities of air can be supplied through small flow inlets. Since cooling air pressure decreases at the downstream end of the air inlet duct, flow inlet area can be increased to increase the amount of air supplied to the downstream partitions. Consequently, this configuration of power supply apparatus can supply cooling air uniformly to all partitions.

As shown by the broken lines in FIG. 3, the power supply apparatus may be provided with an air outlet duct 16 at the surface of the second surface plate 2b, and this outlet duct 16 may also connect with a fan 9. The fan 9 forcibly intakes cooling air from the outlet duct 16 and exhausts it. The outlet duct 16 joins air flow expelled from each partition 4 and exhausts it. In the power supply apparatus shown in FIG. 3, the plurality of exhaust outlets 14 opened through the second surface plate 2b all have equal area. However, although it is not illustrated, the power supply apparatus may also have larger exhaust outlets at the upstream end of the air outlet duct than at the downstream end of the outlet duct. This is for the purpose of passing cooling air uniformly through all partitions. Since the fan efficiently intakes cooling air at the downstream end of the outlet duct, large quantities of air can be expelled from small exhaust outlets. Consequently, this configuration of power supply apparatus can pass cooling air uniformly through all partitions.

In particular, the exhaust outlet corresponding to a flow inlet at the downstream end of the outlet duct can be made smaller than the exhaust outlet corresponding to a flow inlet at the upstream end. In this power supply apparatus, flow inlets gradually increase in size from the upstream end to the downstream end, and exhaust outlets gradually decrease in size from the upstream end to the downstream end. In this power supply apparatus, air flow rate from a narrow exhaust outlet can be made faster than that from a wide exhaust outlet. For this reason, even power modules located at a distance from a fan can be efficiently cooled.

Further, as shown in FIGS. 7 to 9, the power supply apparatus may be provided with an air inlet duct 715, 815, 915 at the surface of the first surface plate 72a, 82a, 92a and an air outlet duct 716, 816, 916 at the surface of the second surface plate 72b, 82b, 92b. In this power supply apparatus, a fan may be connected to either or both the inlet duct 715, 815, 916 and the outlet duct 716, 816, 916 to forcibly induce air flow. In this type of power supply apparatus having an inlet duct 715, 815, 915 and an outlet duct 716, 816, 916 the air inlet location and outlet location can be specified.

Figure 10:
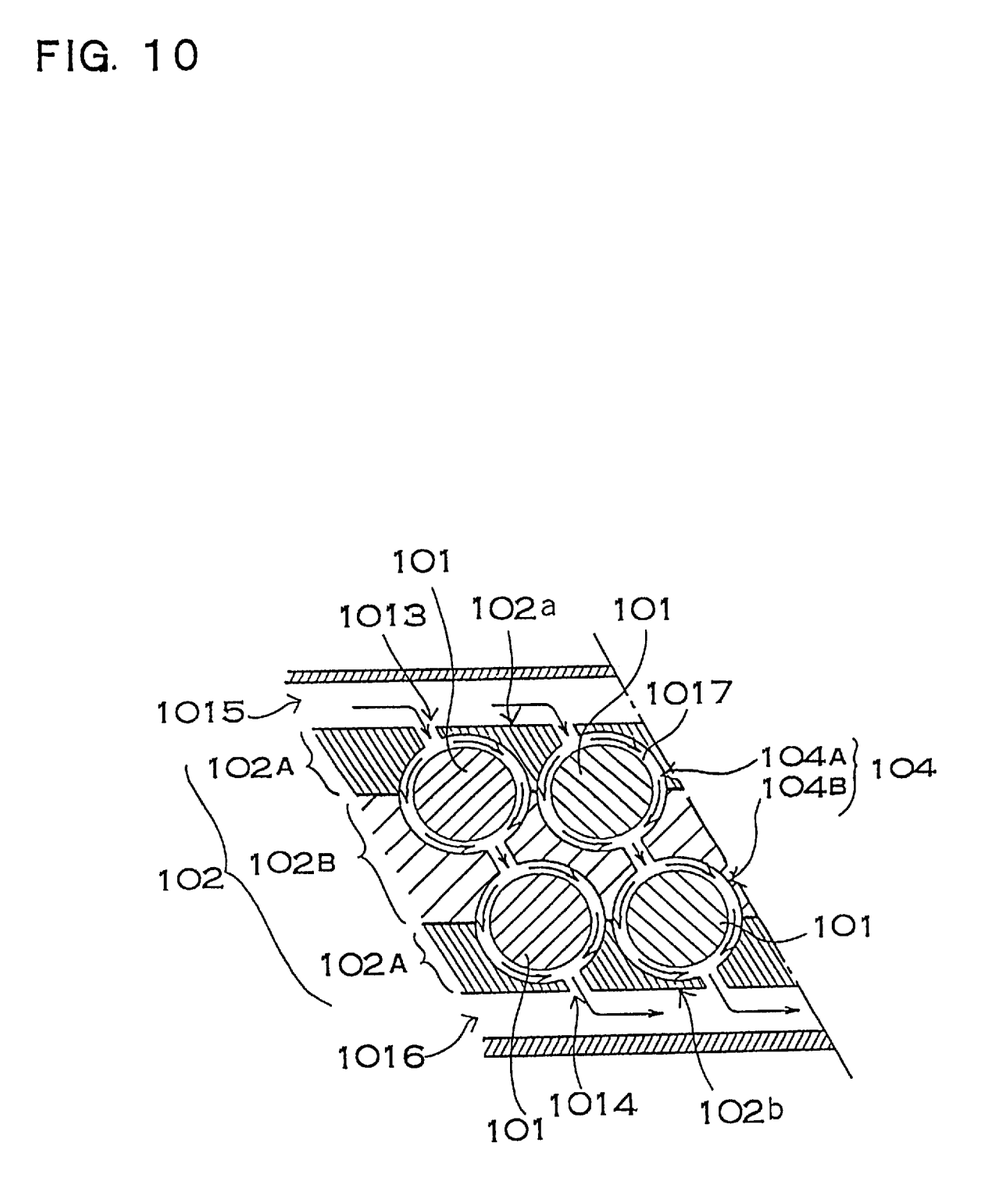
FIG. 10 is a cross-section view of another embodiment of the power supply apparatus of the present invention.

In the power supply apparatus described above, two rows of power modules 1, 71, 81, 91 are arranged in vertically aligned columns as shown in the figures. However, in the power supply apparatus of the present invention, a plurality of rows of a plurality of power modules may also be arranged with power modules of adjacent rows offset from vertical alignment. The power supply apparatus shown in FIG. 10 has power modules 101 arranged in two rows with their positions slightly shifted left and right out of vertical alignment. In particular, the power supply apparatus shown in FIG. 10 has each row of power modules 101 offset to inclining the direction of air flow from the flow inlets 1013 to the exhaust outlets 1014 compared to a vertical line from the first surface plate 102a to the second surface plate 102b. For this reason the system has the characteristic that air supplied by the inlet duct 1015 can be rapidly directed into flow inlets 1013 and induced to flow in the upstream partitions 104A. The system also has the characteristic that air passed through the downstream partitions 104B can be smoothly exhausted from the exhaust outlets 1014 to the outlet duct 1016. In FIG. 10,102 is the holder-case, 102A are cover-casings, 102B is the intermediate-casing, 104 are partitions, and 1017 are cooling ducts.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims or equivalence of such meets and bounds thereof are therefore intended to be embraced by the claims.

What is claimed is:

1. A power supply apparatus comprising:
   (a) a plurality of power modules;
   (b) a holder-case which houses power modules arranged in a parallel fashion in a plurality of columns, and which cools the power modules with air passing through its interior;
   (c) a fan which forcibly supplies air to, or exhausts air from, the holder-case; and wherein
   (d) the holder-case is a box shape and has a first surface plate and a second surface plate as opposite surfaces, and a plurality of power modules are arranged laterally along the first surface plate and the second surface plate in a plurality of columns;
   (e) the holder-case is provided with walls between the plurality of power modules housed in a lateral arrangement with a plurality of columns, and between the first surface plate and the second surface plate, the walls extend from the first surface plate to the second surface plate, the interior is divided into a plurality of columns of partitions, and power modules are disposed in each partition column;
   (f) surfaces of walls which face power modules are shaped to follow the contours of power module surfaces, cooling ducts of constant width are established between power module surfaces and opposing wall surfaces, and air directed into the partitions is made to flow along power module surfaces via the cooling ducts;
   (g) flow inlets are opened through the first surface plate of the holder-case to divide air flow and induce air flow into the plurality of partition column cooling ducts, and exhaust outlets are opened through the second surface plate to expel air to the outside which has passed through the plurality of partition column cooling ducts; and
   (h) air flow is divided and induced to flow through first surface plate flow inlets into a plurality of partition columns using a fan, air is passed through cooling ducts to cool power modules, air which has performed its cooling function is expelled from second surface plate exhaust outlets, and power modules disposed in a plurality of partition columns are cooled.

2. A power supply apparatus as recited in claim 1 wherein the power modules are a plurality of rechargeable batteries connected in a linear fashion.

3. A power supply apparatus as recited in claim 1 wherein the power modules are a plurality of super capacitors connected in a linear fashion.

4. A power supply apparatus as recited in claim 1 wherein the holder-case is provided with upper and lower cover-casings and an intermediate-casing disposed between the cover-casings, and the cover-casings are provided with a first cover-casing formed as a single piece with the first surface plate and a second cover-casing formed as a single piece with the second surface plate.

5. A power supply apparatus as recited in claim 1 wherein wall surfaces facing power modules are provided with retaining projections, ends of the retaining projections contact power module surfaces, and power modules are thereby held inside the partitions.

6. A power supply apparatus as recited in claim 5 wherein the retaining projections are provided extending in lateral directions with respect to power module orientation.

7. A power supply apparatus as recited in claim 1 wherein cooling duct width is approximately constant over the entire perimeter of a power module.

8. A power supply apparatus as recited in claim 1 wherein power modules and partitions are shaped as circular columns, power modules are disposed at partition centers, and cooling ducts of constant width are thereby established.

9. A power supply apparatus as recited in claim 1 wherein a plurality of power modules are arranged in a parallel fashion in a plurality of rows and a plurality of columns and housed in the holder-case.

10. A power supply apparatus as recited in claim 1 wherein the holder-case houses a plurality of power modules arranged in two rows, and at least one dead air space is established in the upstream partition of the first row disposed on the side of the first surface plate.

11. A power supply apparatus as recited in claim 10 wherein cooling ducts of the downstream partition are made nearly constant in width over approximately the entire power module circumference, and the width of cooling ducts of the upstream partition are made wider than the width of cooling ducts of the downstream partition to establish at least one dead air space.

12. A power supply apparatus as recited in claim 11 wherein cooling ducts of the upstream partition are made nearly constant in width over approximately half the power module circumference, in the remaining half they are made wider to establish dead air spaces.

13. A power supply apparatus as recited in claim 12 wherein dead air spaces are established on the downstream side of the upstream partition.

14. A power supply apparatus as recited in claim 11 wherein a plurality of dead air spaces are established over approximately the entire power module circumference in the upstream partitions.

15. A power supply apparatus as recited in claim 10 wherein the upstream partition is square-shaped in a cross-section view, and a dead air space is established in each part of its four corners.

16. A power supply apparatus as recited in claim 10 wherein the width of cooling ducts between the upstream and downstream sides in the upstream partitions is equal to the width of cooling ducts of the downstream partition.

17. A power supply apparatus as recited in claim 10 wherein the holder-case houses a plurality of power modules arranged in two rows, and bypasses are established to direct air flow from upstream partitions in the first row disposed on the side of the first surface plate to downstream partitions in the second row disposed on the side of the second surface plate.

18. A power supply apparatus as recited in claim 17 wherein the bypasses extend in a tangential direction from both sides of a dead air space to connect with a downstream partition.

19. A power supply apparatus as recited in claim 1 wherein the holder-case houses a plurality of power modules arranged in a plurality of rows, and the plurality of power modules of adjacent rows are offset from vertical alignment.

20. A power supply apparatus as recited in claim 1 wherein slit shaped flow inlets are opened through the first surface plate, positioned at the center region of the partitions of the holder-case, and slit shaped exhaust outlets are opened through the second surface plate.

21. A power supply apparatus as recited in claim 1 wherein an air inlet duct is provided at the surface of the first surface plate, this inlet duct connects with a fan, and inlet duct cooling air flow is divided among each flow inlet and introduced into each partition.

22. A power supply apparatus as recited in claim 1 wherein an air outlet duct is provided at the surface of the second surface plate, this outlet duct connects with a fan, the fan forcibly intakes cooling air from the outlet duct, and air flow expelled from each partition converges and is exhausted to the outside.

23. A power supply apparatus as recited in claim 1 wherein an air inlet duct is provided at the surface of the first surface plate, an air outlet duct is provided at the surface of the second surface plate, and a fan is connected to either or both the inlet duct and the outlet duct to forcibly induce air flow.

* * * * *